(12) United States Patent
Okamoto et al.

(10) Patent No.: US 8,201,199 B2
(45) Date of Patent: Jun. 12, 2012

(54) MONITORING SYSTEM

(75) Inventors: Shusaku Okamoto, Kanagawa (JP); Masamichi Nakagawa, Osaka (JP); Takashi Yoshida, Osaka (JP); Atsushi Iisaka, Osaka (JP); Atsushi Morimura, Nara (JP)

(73) Assignee: Panasonic Corporation, Osaka (JP)

( * ) Notice: Subject to any disclaimer, the term of this patent is extended or adjusted under 35 U.S.C. 154(b) by 489 days.

(21) Appl. No.: 12/369,979

(22) Filed: Feb. 12, 2009

(65) Prior Publication Data

US 2009/0174775 A1 Jul. 9, 2009

Related U.S. Application Data

(63) Continuation of application No. 10/173,316, filed on Jun. 17, 2002.

(30) Foreign Application Priority Data

Jun. 18, 2001 (JP) ................. 2001-182741

(51) Int. Cl.
G06F 3/00 (2006.01)
G06F 13/00 (2006.01)
H04N 5/445 (2011.01)
H04N 7/18 (2006.01)

(52) U.S. Cl. ............. 725/40; 725/37; 725/74; 348/143; 348/147; 348/148

(58) Field of Classification Search .................. 348/149
See application file for complete search history.

(56) References Cited

U.S. PATENT DOCUMENTS

| 5,220,508 | A | * | 6/1993 | Ninomiya et al. | 701/207 |
| 5,329,310 | A | * | 7/1994 | Liljegren et al. | 348/147 |
| 5,646,614 | A | | 7/1997 | Abersfelder et al. | 340/932.2 |
| 5,661,472 | A | | 8/1997 | Koshizawa | 340/901 |
| 5,670,935 | A | | 9/1997 | Schofield et al. | 340/461 |
| 5,859,626 | A | | 1/1999 | Kawamura | 345/99 |

(Continued)

FOREIGN PATENT DOCUMENTS

DE 100 83 445 T1 11/2001

(Continued)

OTHER PUBLICATIONS

McLean, G.F.; "Image Warping for Calibration and Removal of Lens Distortion"; Communications, Computers and Signal Processing; 1993; IEEE Pacific Rim Conference on Victoria, BC, Canada; May 19-21, 1993; pp. 170-173; XP010141635; ISBN: 0-78030971-5; the whole document.

(Continued)

*Primary Examiner* — Justin Shepard
(74) *Attorney, Agent, or Firm* — Harness, Dickey, Pierce, PLC

(57) ABSTRACT

A camera for taking a state behind a vehicle is installed in a position laterally shifted from the rear center of the vehicle. An image processing unit generates a rear image from a camera image by shifting merely a rectangular area of the camera image so that a vertical center line thereof can substantially accord with the center line along the lengthwise direction of the vehicle. Furthermore, processing for correcting lens distortion may be performed. As a result, when the vehicle is moved straight backward, an object present on the center line of the vehicle moves vertically in substantially the center of the screen, so that a user can be prevented from having an odd feeling to see the image.

1 Claim, 11 Drawing Sheets

Installation position: Laterally shifted by 50 cm
from center line of vehicle
Height: 70 cm
Facing direction: Straight backward,
obliquely downward and
slightly toward center

U.S. PATENT DOCUMENTS

| | | | |
|---|---|---|---|
| 6,005,492 A | 12/1999 | Tamura et al. | 340/937 |
| 6,184,781 B1 | 2/2001 | Ramakesavan | 340/435 |
| 6,476,855 B1 | 11/2002 | Yamamoto | 348/148 |
| 6,813,371 B2 * | 11/2004 | Kakinami | 382/104 |
| 6,985,171 B1 | 1/2006 | Kuriya et al. | 348/148 |
| 7,161,616 B1 * | 1/2007 | Okamoto et al. | 348/148 |

FOREIGN PATENT DOCUMENTS

| | | |
|---|---|---|
| EP | 1 004 916 A1 | 5/2000 |
| EP | 1 005 234 A2 | 5/2000 |
| EP | 1 115 250 A1 | 7/2001 |
| EP | 1 179 958 A1 | 2/2002 |
| FR | 2 673 499 | 9/1992 |
| FR | 2780230 | 12/1999 |
| JP | 03-099952 | 4/1991 |

OTHER PUBLICATIONS

Pardhy, S. et al.; "A Virtual Mirror for Assisting Drivers"; Intelligent Vehicles Symposium, 2000; IV 2000; Proceedings of the IEEE Dearborn, MI, USA; Oct. 3-5, 2000; Piscataway, NJ, USA; IEEE, US; Oct. 3, 2000; pp. 255-260; XP010528946; ISBN: 0/7803-6363-9; the whole document.

European Search Report for European Application No. 02013340; mailed Nov. 3, 2003.

* cited by examiner

Installation position: Laterally shifted by 50 cm from center line of vehicle
Height: 70 cm
Facing direction: Straight backward and obliquely downward FIG. 4A  Moving straight backward by 25 cm

```
Installation position: Laterally shifted by 50 cm
                      from center line of vehicle
             Height: 70 cm
   Facing direction: Straight backward,
                     obliquely downward and
                     slightly toward center
```

FIG. 8A
FIG. 8B
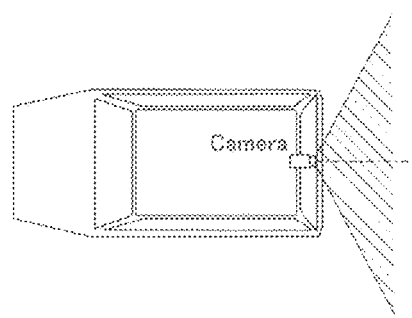
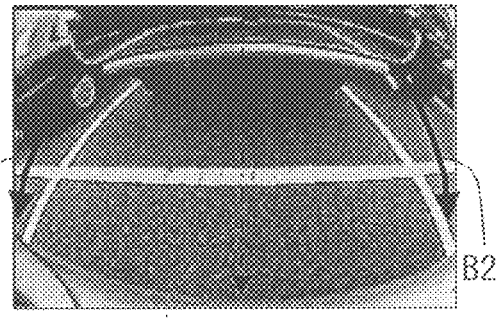
B1, B2
Moving straight backward by 25 cm
A
FIG. 8C
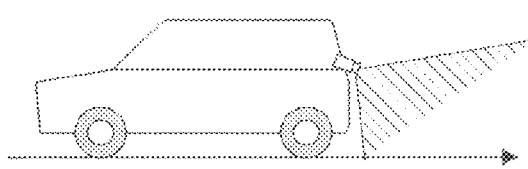
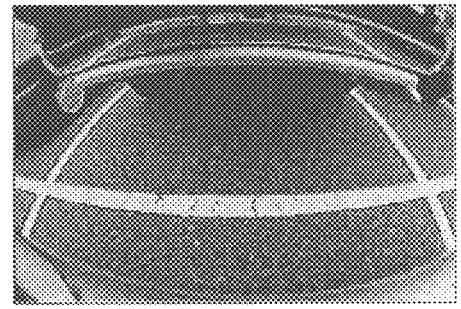
Installation position: On center line of vehicle
Height: 70 cm
Facing direction: Straight backward and obliquely downward Moving straight backward by 25 cm Moving straight backward by 25 cm

MONITORING SYSTEM

CROSS-REFERENCE TO RELATED APPLICATION

This application is a continuation of U.S. patent application Ser. No. 10/173,316 filed on Jun. 17, 2002. The entire disclosure of the above application is incorporated herein by reference.

BACKGROUND OF THE INVENTION

The present invention relates to a technique for a monitoring system for providing safety driving environment by displaying a processed image of the sate around a vehicle taken by a camera installed on the vehicle.

As an apparatus for monitoring the state around a vehicle by using a camera, a system in which an image taken by a camera installed on a rear trunk room or the like of a vehicle is presented to a driver is conventionally known. Thus, the driver can be informed of the state in the rear of the vehicle. Furthermore, a system for supporting a parking operation in which not only a camera image but also possible travel loci of tires overlapping the camera image are present has recently been known. Thus, the driver can grasp the state ahead in a moving direction of the vehicle.

A conventional system will be described with reference to FIGS. 8A through 8C. FIG. 8A is a schematic diagram of a camera installation mode, FIG. 8B shows an exemplified camera image obtained in the camera installation mode of FIG. 8A, and FIG. 8C shows an image obtained when the vehicle is moved straight backward by 25 cm from the position where the image of FIG. 8B is obtained. In the image of FIG. 8B, another vehicle parks just behind the vehicle, a dashed line A extending in the center indicates how the center of the vehicle behind approaches on the screen while the vehicle is moving straight backward, and solid lines B1 and B2 on the left and right hand sides indicate how the left and right corners of the vehicle behind approach on the screen while the vehicle is moving straight backward.

In the example shown in FIGS. 8A through 8C, when the vehicle is moved straight backward, an object present just behind the vehicle (i.e., another vehicle in this case) gets close to the vehicle in the downward direction vertically on the screen. Therefore, it can be easily grasped whether or not the center of the vehicle corresponds to the center of the object.

If the camera is installed so as to face to substantially the same direction as the straight reversing direction of the vehicle and to be positioned substantially at the center of the rear portion of the vehicle in the aforementioned conventional monitoring system, the system is very useful for a user. This is because an object moving vertically on the screen can be identified as an object present on an extended center line of the vehicle, and hence, the moving direction of the vehicle can be grasped intuitively on the basis of the displayed image.

However, if the camera is not installed at substantially the center of the rear portion of the vehicle, this conventional system has a problem.

For example, a license plate, a rear windshield wiper, a locking mechanism for a trunk room, a spare tire and the like are generally placed around the center of the rear portion of a vehicle, and hence it may be difficult to secure a place for installing the camera. Also, the position of the camera may be shifted so that a specified direction or region can be easily taken. For example, the position of the camera may be shifted toward the passenger's seat side so that a larger region on the passenger's seat side where a driver is difficult to see from the driver's seat can be taken.

In another camera installation mode shown in FIG. 2, the camera faces to the straight backward direction but its position is laterally shifted by approximately 50 cm from the center of the rear portion of the vehicle. FIG. 9A shows an exemplified camera image obtained in the camera installation mode of FIG. 2, and FIG. 9B shows an image obtained when the vehicle is moved straight backward by approximately 25 cm from the position where the image of FIG. 9A is taken. Also in FIG. 9A, the dashed line A and the solid lines B1 and B2 have the same meanings as in FIG. 8B.

In this case, another vehicle present just behind the vehicle is imaged in an area close to the edge of the screen, and hence, it is difficult to grasp, on the screen, the positional relationship between the vehicle and the other vehicle behind. Also, when the vehicle is moved straight backward, the other vehicle behind approaches not in the vertical direction but in an oblique direction on the screen.

In still another camera installation mode shown in FIG. 6, the camera faces to a direction slightly toward the center line rather than the straight backward direction and its position is laterally shifted by approximately 50 cm from the center of the rear portion of the vehicle. FIG. 10A shows an exemplified camera image taken in the cameral installation mode of FIG. 6, and FIG. 10B shows an image obtained when the vehicle is moved straight backward by approximately 25 cm from the position where the image of FIG. 10A is taken. Also in FIG. 10A, the dashed line A and the solid lines B1 and B2 have the same meanings as in FIGS. 8B and 9A.

In the case where the position of the camera is shifted from the rear center of the vehicle, if the camera faces to the straight backward direction of the vehicle as in FIG. 2, the visual range in a side rear region of the vehicle opposite to the camera installation position is small as is understood from FIG. 9A. In order to obtain a well-balanced image on the right and left sides of the vehicle, the camera should face to a direction toward the center line of the vehicle. When the images of FIGS. 10A and 9A are compared, it is understood that a left rear region of the vehicle is shown more largely in FIG. 10A.

In this case, when the vehicle is moved straight backward, another vehicle present just behind the vehicle approaches in a more oblique direction on the screen than in FIG. 9A.

In this manner, in the conventional system an object actually present just behind a vehicle is imaged in an area close to the edge of the screen or moves in an oblique direction on the screen when the vehicle is moved straight backward. Therefore, when such an image is presented to a user, the user may have an odd feeling to see the image, which makes it difficult to check whether or not the vehicle is moving straight backward or whether or not the center of the vehicle corresponds to that of a target. As a result, there is a fear of a driving operation error.

SUMMARY OF THE INVENTION

An object of the invention is providing a rear image which does not give an odd feeling to a user even when a camera for taking an image of a state behind a vehicle is installed in a position shifted from the rear center of the vehicle.

Specifically, the monitoring system of this invention comprises a camera for taking an image of a state behind a vehicle, installed in a rear portion of the vehicle in a position shifted from a center line along the lengthwise direction of the vehicle; and an image processing unit for receiving a camera image of the camera and generating a rear image of the state behind the vehicle on the basis of the camera image, and the image processing unit performs image processing for allowing a vertical center line of the rear image to substantially accord with the center line along the lengthwise direction of the vehicle.

According to the invention, in the rear image displayed on a display device, the center line along the lengthwise direction of the vehicle substantially accords with the vertical center line of the displayed image. Therefore, when the vehicle is moved straight backward, an object present on the center line of the vehicle is moved vertically in substantially the center of the screen, and hence, this image does not give an odd feeling to a user. In other words, even when the camera is installed in a position laterally shifted from the rear center of the vehicle, the rear image as if it were taken by a camera installed in the rear center of the vehicle and facing to the straight backward direction can be presented to the user. As a result, the restriction in the installation position and the facing direction of the camera of the monitoring system can be reduced, so as to increase the freedom in the camera installation.

The image processing unit of the monitoring system of this invention preferably performs parallel shifting processing at least on the camera image. Furthermore, the image processing unit preferably performs lens distortion correcting processing on the camera image.

Moreover, the image processing unit of the monitoring system of this invention preferably performs processing for converting the camera image into an image seen from a virtual viewpoint set above the rear center of the vehicle.

BRIEF DESCRIPTION OF THE DRAWINGS

FIGS. 4A, 4B, 4C and 4D are diagrams of exemplified images for explaining image processing according to Embodiment 2 of the invention;

FIG. 8A is a diagram of a conventional camera installation mode and FIGS. 8B and 8C are diagrams of exemplified images obtained in the camera installation mode of FIG. 8A;

DETAILED DESCRIPTION OF THE INVENTION

Preferred embodiments of the invention will now be described with reference to the accompanying drawings.

First, the entire structure of a monitoring system of this invention necessary for practicing each embodiment will be described, and thereafter, a variety of examples of display screen modes will be described in detail.

Figure 1:
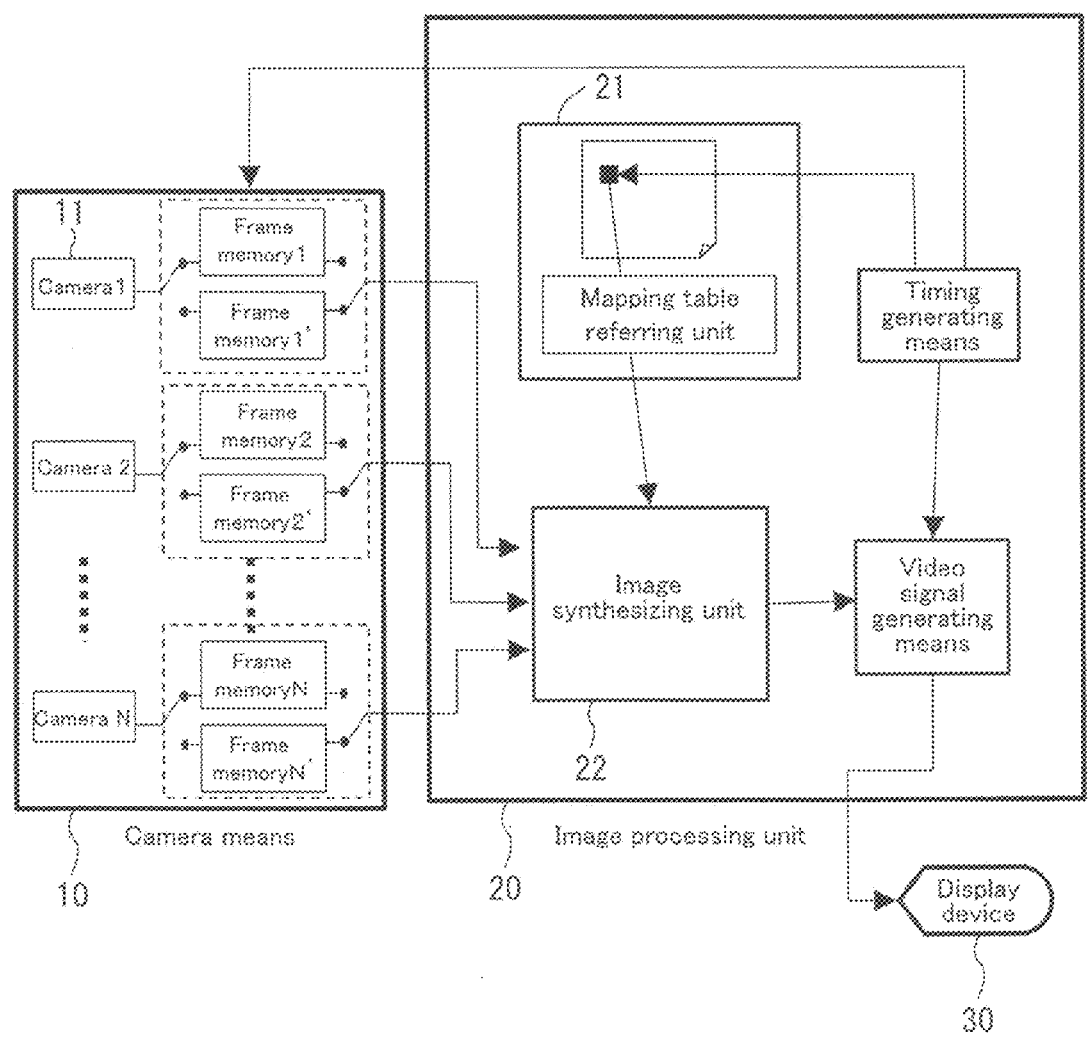
FIG. 1 is a block diagram for showing an exemplified structure of a monitoring system according to the invention.

FIG. 1 is a block diagram for showing the structure of the monitoring system of this invention. In the monitoring system of FIG. 1, an image processing unit 20 receives, as inputs, a plurality of camera images output from camera means 10 including cameras 11, so as to generate a new image by transforming and synthesizing the input camera images. This synthesized image is displayed by a display device 30. The image processing unit 20 corresponds to an image processor of this invention.

The display device 30 of this invention is typically a liquid crystal display, and may be another display device such as a plasma display. Also, the display device of this invention may be used also as a vehicle-install type GPS terminal display (namely, a display of what is called a car navigation system) or may be separately prepared.

The camera means 10 is a color or monochrome digital camera typically including a solid state image sensor such as a CCD or a CMOS device. Alternatively, the camera means 10 may include a combination of a lens and a prism or a mirror so as to transfer incident light to the lens and the prism or the mirror through a predetermined optical path to a camera device disposed away from the camera means 10.

The image processing unit 20 transforms/synthesizes a camera image of at least one camera, so as to generate a synthesized image in which the input image is shifted laterally or a synthesized image as if it were vertically or obliquely looked down from above the vehicle. In order to generate the synthesized image, it is necessary to perform image transforming processing and synthesizing processing of partial images obtained by cutting out necessary areas of the transformed images (including processing such as smoothing boundaries between the partial images (hereinafter referred to as the boundary processing) if a plurality of camera images are used). For this purpose, the structure of FIG. 1 includes a mapping table referring unit 21, and a mapping table is used for processing the camera images in one step.

An image synthesizing unit 22 receives the camera images from the cameras 1 through N and processes these camera images. The processing performed at this point are ① processing for transforming and cutting the images and ② processing for synthesizing cut partial images (including the boundary processing). The processing ① and ② may be separately performed, or all or part of these processing may be performed in one step. In the structure of FIG. 1, the mapping table is included for performing the processing of the camera images in one step.

A "mapping table" means a table in which the corresponding relationships between pixels of a synthesized image and pixel data of the respective camera images are described, and is used for rapidly generating a synthesized image. When such a mapping table is previously built through calculation using geometric conversion or manual operations, a desired synthesized image can be rapidly generated.

The mapping table is specifically stored in, for example, a ROM (including a writable erasable ROM such as an EEPROM) or a RAM. For storing the mapping table, mapping data obtained through calculation by a processor included in the image processing unit may be written in a ROM or a RAM, or mapping table data provided as firmware may be written in a RAM or a ROM by using data transfer means such as a communication line and a disk drive.

Now, examples of a variety of display screen modes according to this invention will be described in detail.

Embodiment 1

Figure 2:
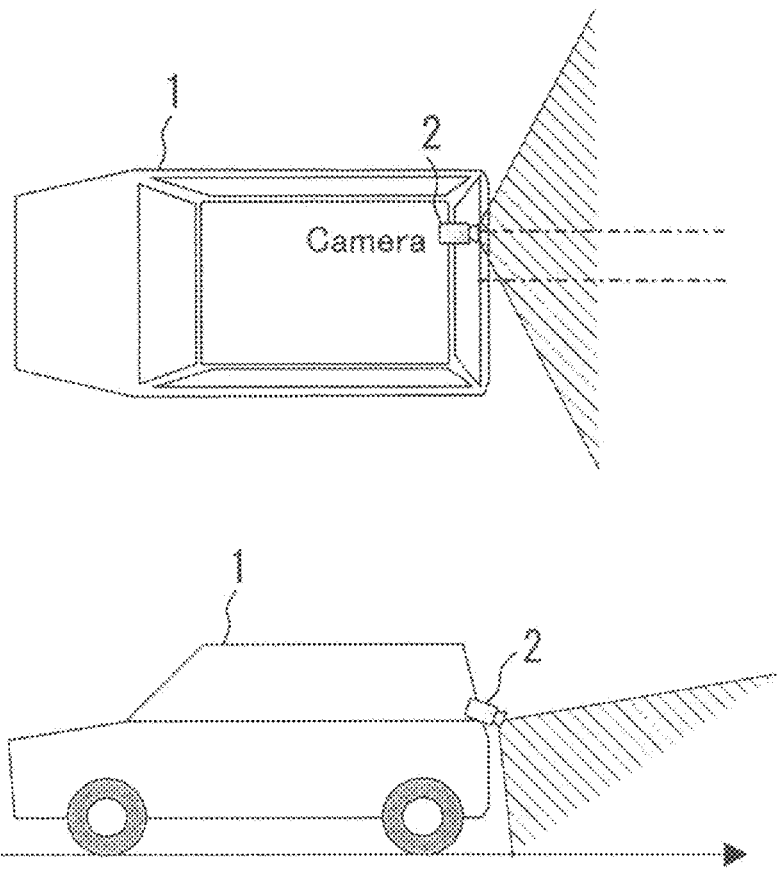
FIG. 2 is a diagram for showing an example of a camera installation mode.

In Embodiment 1, an example of processing employed in a camera installation mode in which a camera 2 facing to a straight backward direction of a vehicle 1 is installed in a position laterally shifted from the rear center of the vehicle 1 as shown in FIG. 2 will be described. The contents of this processing will now be described by using a camera image and a display screen mode resulting from the processing.

Figure 3A:
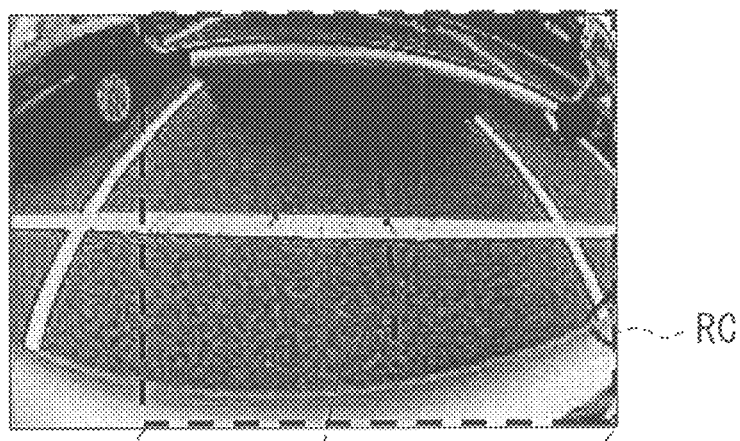
FIGS. 3A, 3B and 3C are diagrams of exemplified images for explaining image processing according to Embodiment 1 of the invention.
Figure 3B:
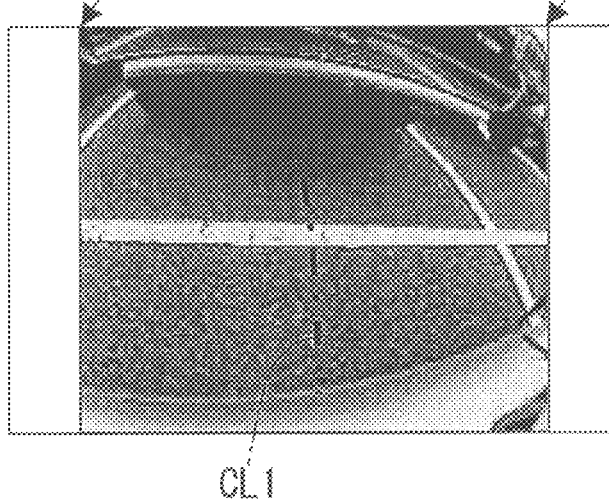

FIG. 3A is a camera image taken in the cameral installation mode of FIG. 2 and FIG. 3B is a rear image obtained by shifting, in a leftward direction, merely a rectangular area RC1 surrounded with a broken line in the image of FIG. 3A for the purpose of overcoming difficulty in grasping the image due to the lateral shift of the camera position. The rectangular area RC1 is set so that the vertical center line of the rectangular area can substantially accord with an actual center line CL1 along the lengthwise direction of the vehicle 1 (indicated by a solid dashed line in the drawings).

In this case, since merely the position of the camera 2 is slightly shifted from the center of the vehicle 1, when the vehicle 1 is moved straight backward, an object present just behind the vehicle on the center line CL1 moves downward in a substantially vertical direction on the screen. However, owing to the shift of the installation position of the camera 2, the center line CL1 of the vehicle on the road surface is rather shifted in a rightward direction on the monitor screen, and this rightward shift is corrected by cutting out the rectangular area from the original image and shifting it in the leftward direction.

As is understood from the image of FIG. 3B, the vertical center line of the rear image on the monitor screen can be made to substantially accord with the center line CL1 of the vehicle merely by laterally shifting the camera image. Thus, when the vehicle is moved straight backward, at least an object present on the center line CL1 of the vehicle 1 can be made to move smoothly downward in the substantially center of the screen. Therefore, when a driver reverses the vehicle toward a target, it can be easily checked whether or not the vehicle is reversing toward the target on the basis of the movement in the center of the screen.

Next, an example of the simplest method for estimating an appropriate extent of the shift of the image will be described. First, a center line of the vehicle is drawn on the road behind the vehicle. The length of the line depends upon the rear visual range of the camera and a length of 5 m suffices. Then, the state of the center line is taken by the camera, so as to calculate distances from the center of the image of average positions on the right and left hand sides of the center line. This distance corresponds to the extent of the image shift.

On the other hand, in the case where the camera is installed in the rear center of the vehicle, the travel locus of the center of the vehicle is a straight line (as shown in FIG. 8B). However, in the case where the installation position of the camera is shifted from the center, the travel locus is a curve due to the lens distortion. Since the lens distortion is larger in an area farther from the center of the image, the curvature is larger as the shift of the installation position is larger. This curvature cannot be corrected merely by the lateral shift of the image.

The lens distortion can be corrected by two-dimensional image transformation for moving positions of respective pixels of the image in accordance with the characteristic of the lens of the camera. For example, a square lattice pattern is previously taken by a camera so as to measure how the respective lattice points are transformed by the lens distortion, and this transformation is reversely corrected. Thus, the lens distortion can be corrected.

Figure 3C:
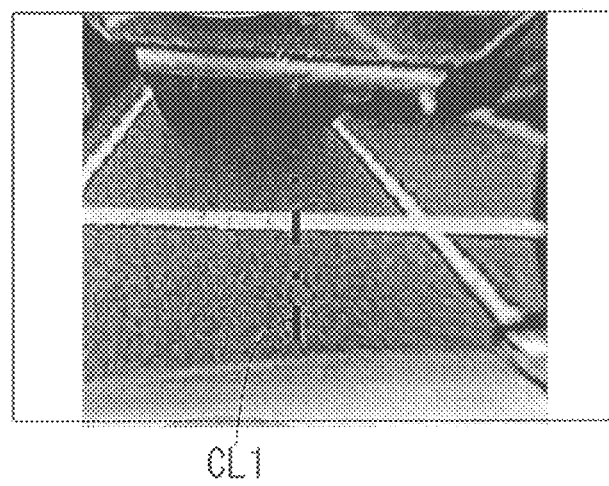

FIG. 3C shows an image obtained from the image of FIG. 3A by correcting the lens distortion and correcting the positional shift of the camera through the lateral shift of the image. In the image as shown in FIG. 3C, when the vehicle is moved backward, an object present on the center line of the vehicle moves straight in the vertical direction in the center of the screen. Therefore, the moving direction of the vehicle and the positional relationship with an object around the vehicle can be more easily grasped.

Embodiment 2

In either or both of a camera installation mode in which the installation position of the camera is largely shifted from the center line of the vehicle and a camera installation mode in which the camera does not face to the straight backward direction, it may be difficult to generate a user-friendly image through the image shifting processing and the distortion correcting processing described in Embodiment 1.

Embodiment 2 corresponds to an aspect in which a user-friendly image can be generated even in these camera installation modes. Now, the contents of processing of Embodiment 2 will be described by using a camera image and a display screen mode resulting from the processing.

First, in a first camera installation mode of Embodiment 2, the installation position of the camera alone is largely shifted from the center of the vehicle as shown in FIG. 2.

Figure 4B:
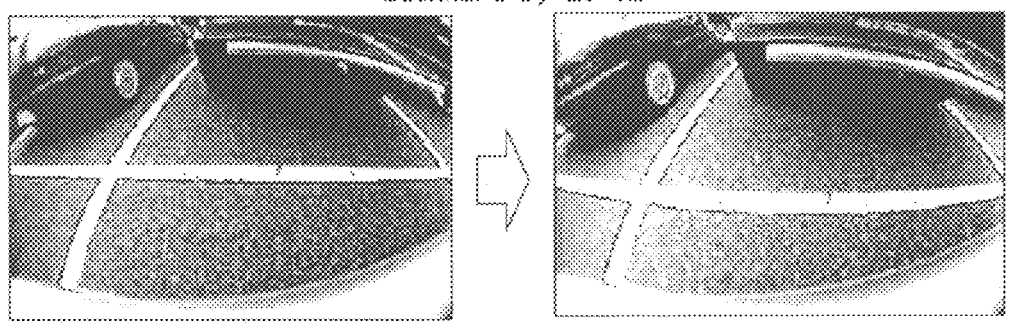
Figure 4B:
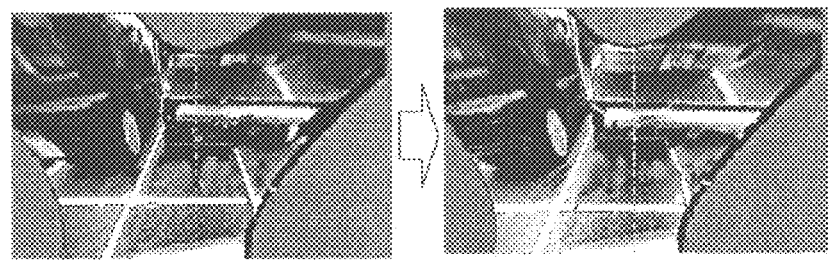

FIG. 4A shows camera images taken in the camera installation mode of FIG. 2, and FIGS. 4B through 4D show synthesized images as if they were seen from a virtual viewpoint obtained by subjecting the images of FIG. 4A to viewpoint converting processing for the purpose of overcoming difficulty in grasping the image due to the lateral shift of the camera position. FIGS. 5A through 5C show the virtual viewpoints employed in the rear images of FIGS. 4B through 4D, respectively. Specifically, the virtual viewpoint is in a position above the rear center of the vehicle and the camera faces to a straight backward direction of the vehicle at an angle of 30 degrees against the road surface in FIG. 5A; the virtual viewpoint is in a position above the rear center of the vehicle and the camera faces to a straight backward direction of the vehicle at an angle of 60 degrees against the road surface in FIG. 5B; and the virtual viewpoint is in a position above the rear center of the vehicle and the camera faces straight downward in FIG. 5C.

Figure 4C:
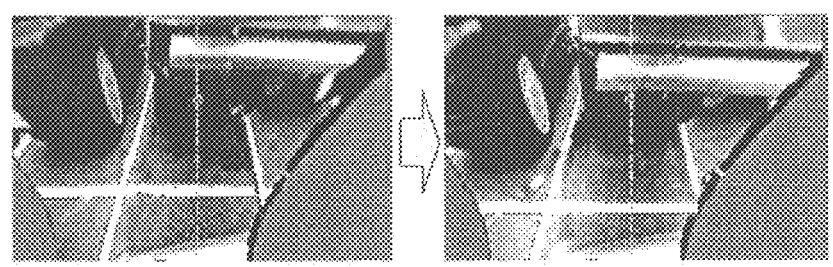
Figure 4D:
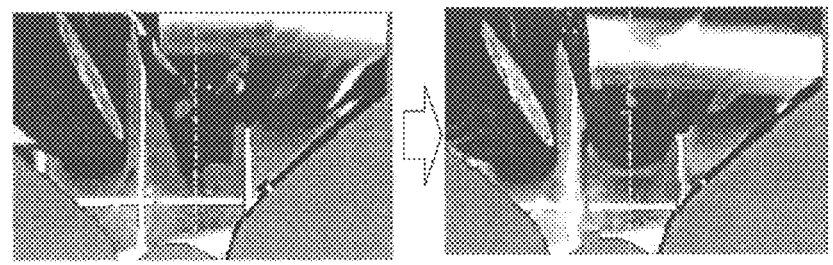
Figure 5A:
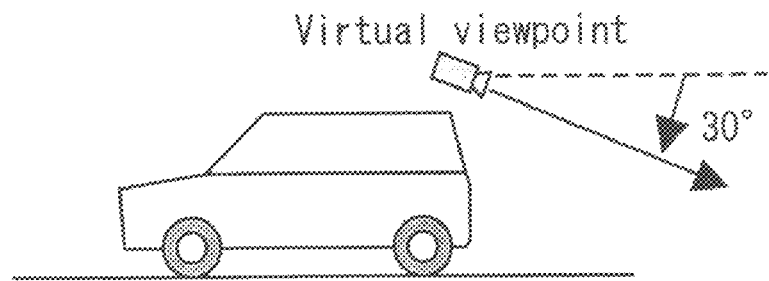
FIGS. 5A, 5B and 5C are diagrams for showing virtual viewpoints employed in FIGS. 4B through 4D and 7B through 7D, respectively.
Figure 5B:
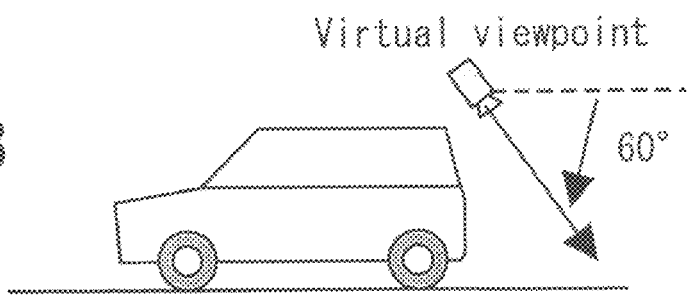
Figure 5C:
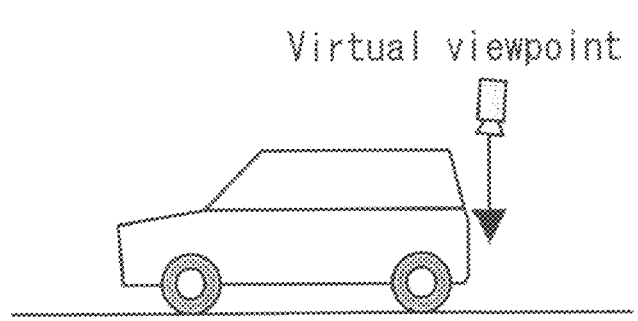

Each of the images of FIGS. 4B through 4D is processed through the virtual viewpoint converting processing so that the center line CL1 along the lengthwise direction of the vehicle on the road surface can accord with the vertical center line of the screen. In addition, when the vehicle is moved straight backward by 25 cm, an object on the center line CL1 of the vehicle moves straight downward in the vertical direction on the screen.

Furthermore, as shown in FIGS. 5A through 5C, the virtual viewpoint can be given an angle of depression independently of the angle of depression of the actually used camera. Therefore, the positional relationship with a feature on a road surface (such as a white line) can be more easily grasped by generating an image as if it were looked down from further above.

Figure 6:
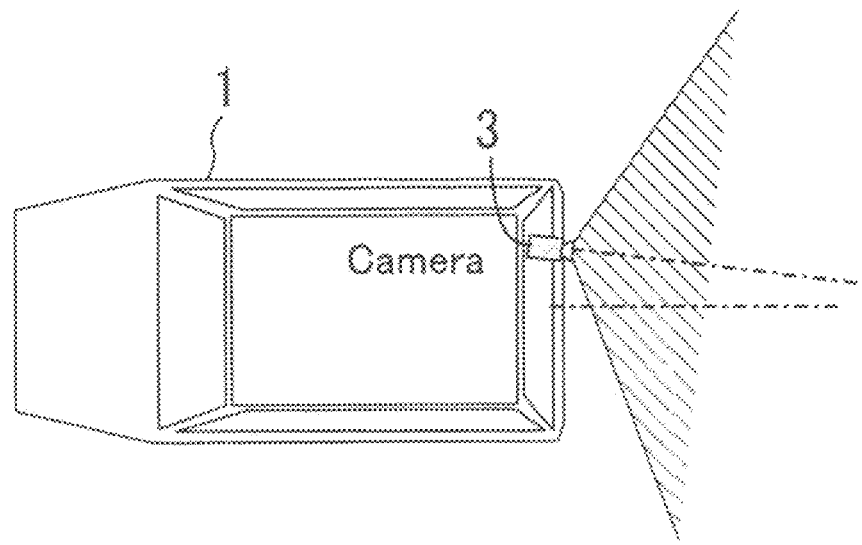
FIG. 6 is a diagram for showing another camera installation mode.
Figure 6:
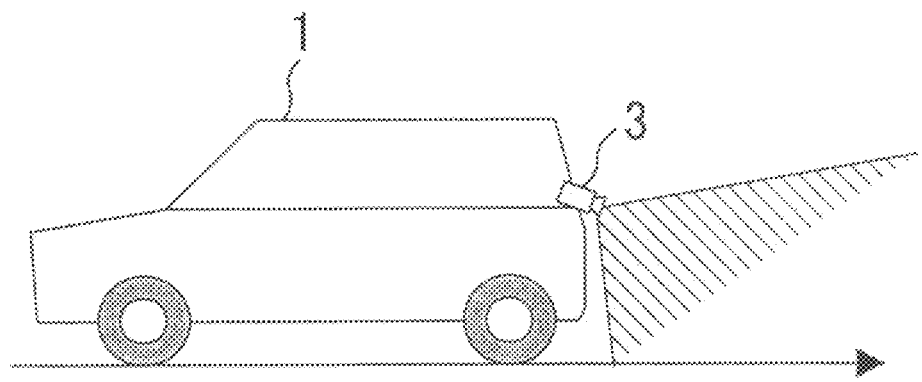

Next, in a second camera installation mode of Embodiment 2, the installation position of the camera is largely shifted from the center of the vehicle and the camera faces to a direction slightly oblique to the straight backward direction of the vehicle as shown in FIG. 6.

Figure 7A:
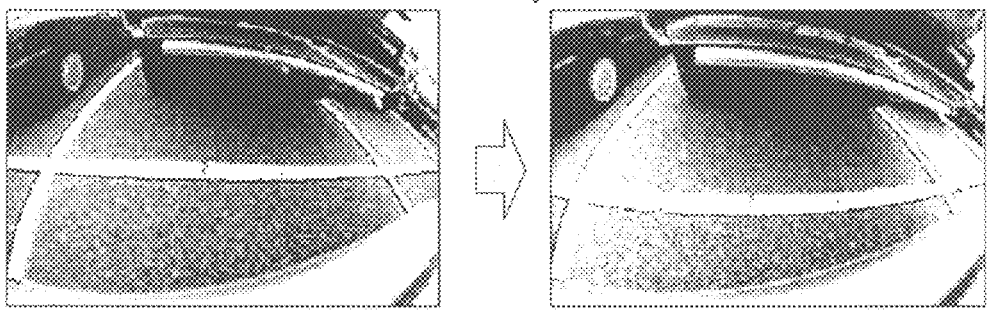
FIGS. 7A, 7B, 7C and 7D are diagrams of exemplified images for explaining another image processing of Embodiment 2.
Figure 7B:
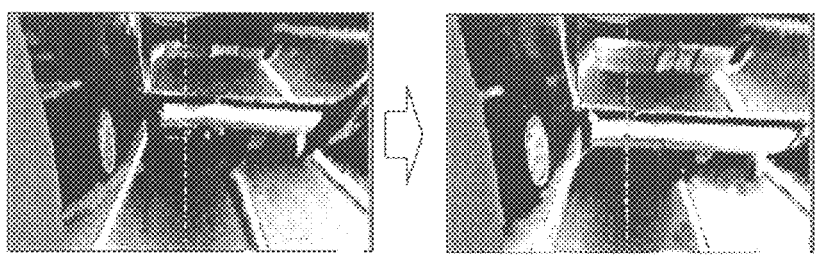
Figure 7C:
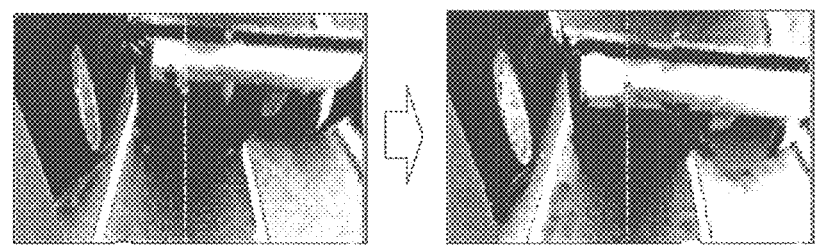

FIG. 7A shows camera images taken in the camera installation mode of FIG. 6, and FIGS. 7B through 7D show synthesized images as if they were seen from a virtual viewpoint obtained by subjecting the images of FIG. 7A to the viewpoint converting processing for the purpose of overcoming difficulty in grasping the image due to the lateral shift of the camera position. The virtual viewpoints employed in the images of FIGS. 7B through 7D also correspond to those shown in FIGS. 5A through 5C, respectively.

When these images are compared with the images obtained in the first camera installation mode, although there are differences in dead angle areas and the distortion of three-dimensional objects in the converted images because of the original difference in the camera range, a road surface area such as a white line is substantially the same as that in the image obtained through the virtual viewpoint converting processing of the camera image taken in the first camera installation mode.

Figure 7D:
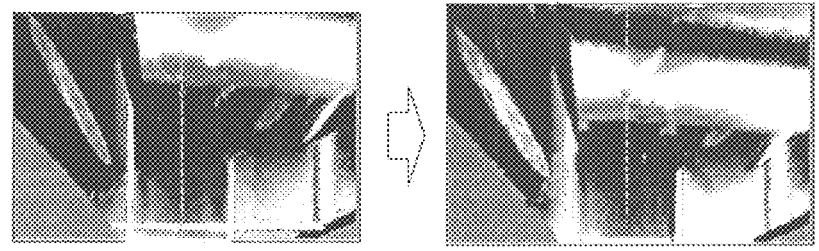
Figure 9A:
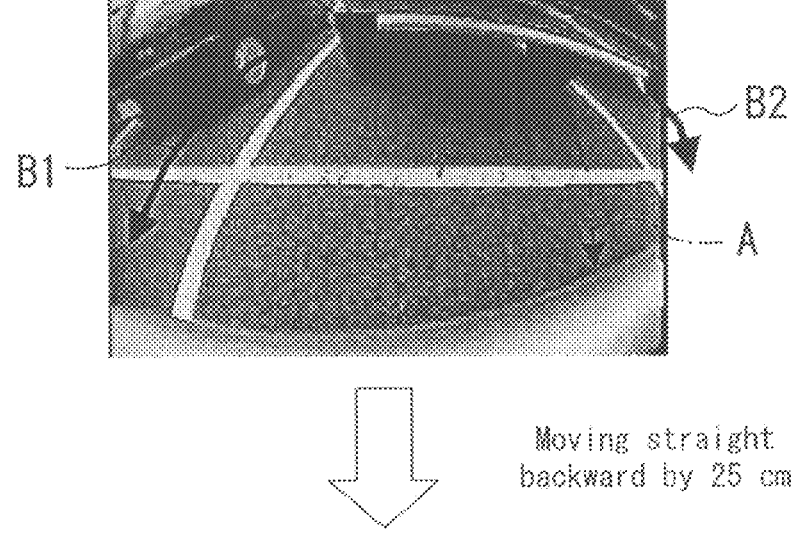
FIGS. 9A and 9B are diagrams of exemplified conventional images obtained in the camera installation mode of FIG. 2.
Figure 9B:
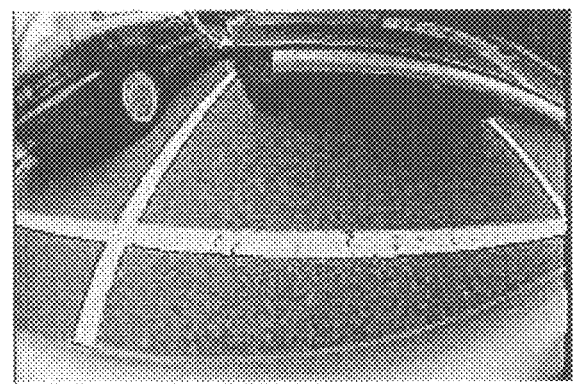
Figure 10A:
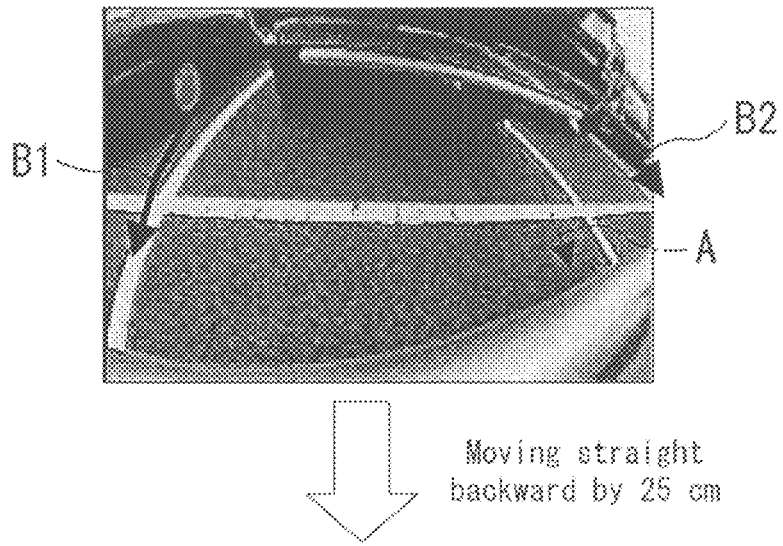
FIGS. 10A and 10B are diagrams of exemplified conventional images obtained in the camera installation mode of FIG. 6.
Figure 10B:
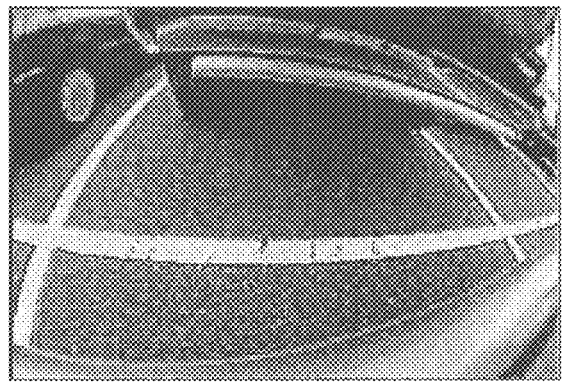
Figure 11A:
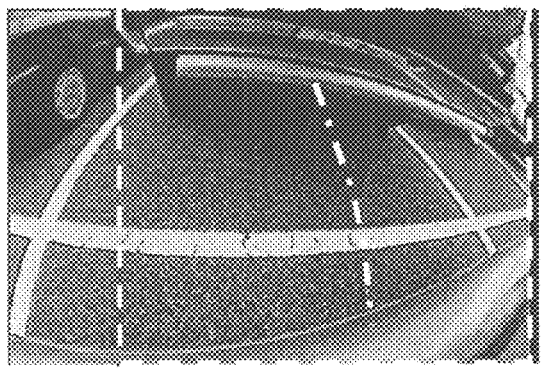
FIGS. 11A, 11B, 11C and 11D are diagram of exemplified images for explaining another image processing of Embodiment 1.
Figure 11B:
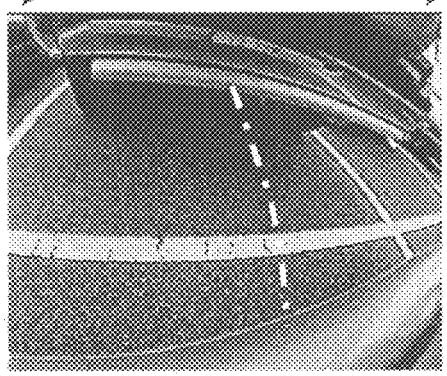
Figure 11C:
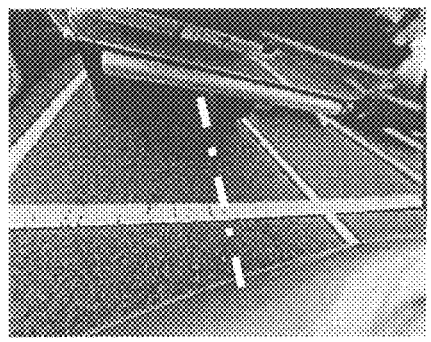
Figure 11D:
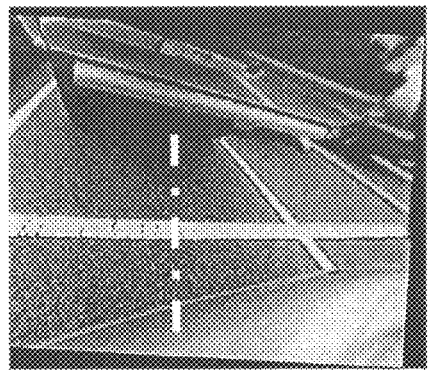

FIGS. 11A trough 11D exemplify a case where the image processing according to Embodiment 1 is applied in the camera installation mode shown in FIG. 6. FIG. 11B is an image obtained by shifting, in a leftward direction, the rectangular area in the image of FIG. 11A, which is an original camera image, FIG. 11C is an image obtained by correcting the lens distortion of the image of FIG. 11B, and FIG. 11D is an image obtained by rotating the image of FIG. 11C so as to conform the direction of the center line with the perpendicular direction of the image. Referring to FIG. 11D, the image remains unbalanced on the right and left sides, which might be the limit in the two-dimensional image processing. In contrast, a more natural image as shown in FIG. 7D can be generated by the virtual viewpoint conversion.

In order to realize a rear image described in each embodiment, a mapping table corresponding to an image to be displayed may be provided or a mapping table may be automatically built in accordance with the situation.

Although merely one camera image is processed in each embodiment, it goes without saying that a plurality of images are input to be converted into one image through the processing.

A vehicle of this invention includes, an ordinary car, a light car, a truck, a bus and the like. In particular, the present invention is very effective in a vehicle in which a camera cannot be installed in the rear center because of a spare tire or the like placed in the rear or for reasons in the design. Also, a special vehicle such as a crane truck and an excavator may be a vehicle of this invention as far as the technical idea of the invention is applicable.

As described above, according to the invention, even when a camera is installed in a position laterally shifted from the rear center of a vehicle, a rear image as if it were taken by a camera installed in the rear center and facing to a straight backward direction can be presented to a user. As a result, the restriction in the installation position and the facing direction of the camera of the monitoring system can be reduced, so as to increase the freedom in the camera installation.

What is claimed is:

1. A monitoring apparatus for use in a vehicle, comprising:
a camera, mounted on the vehicle in a mounting position that is shifted by a predetermined amount from the longitudinal center line of the vehicle, for acquiring an actual image;
a frame memory for storing the acquired actual image as acquired electronic pixel data;
a mapping table referring unit for storing predetermined mapping table data to effect a pixel-to-pixel transformation that includes a lateral left-right translation between the acquired electronic pixel data and synthesized image pixel data corresponding to a synthesized image seen from a synthetic vantage point as if said camera were mounted on said longitudinal center line;
a timing generator, coupled to said frame memory and said mapping table referring unit, for synchronizing both the acquired electronic pixel data and the corresponding mapping table data;
an image synthesizing unit for manipulating each of the synchronized acquired electronic pixel data in accordance with the synchronized corresponding mapping table data to produce the synthesized image, the vertical center line of which substantially coincides with the longitudinal center line of the vehicle;
a video signal generator for providing information of the synthesized image, the information adapted for motion-image display; and
a display device for displaying the synthesized image using the information provided by said video signal generator.

* * * * *